Oct. 7, 1969  J. R. HACKMAN  3,470,902
LIQUID FLOW CONTROL DEVICE
Filed March 1, 1967

INVENTOR.
BY James R. Hackman 3,470,902
LIQUID FLOW CONTROL DEVICE
James R. Hackman, Mount Juliet, Tenn., assignor to the United States of America as represented by the United States Atomic Energy Commission
Filed Mar. 1, 1967, Ser. No. 620,211
Int. Cl. F16k 21/18; F17d 1/00
U.S. Cl. 137—394                                                 6 Claims

ABSTRACT OF THE DISCLOSURE

A device for measuring and controlling the flow of liquid particularly in a pumping system. A vessel, into which a liquid flows, has at its bottom a flow-restricting orifice so that a head of liquid is maintained above the orifice. The flow rate is determined by a gas bubbler liquid level measuring device and a differential pressure transmitter which provides a signal based on said measurement to a liquid level indicator-controller.

Description of the prior art

The invention described herein was made in the course of, or under a contract with the U.S. Atomic Energy Commission.

Heretofore, constricting devices such as flow nozzles, venturi tubes and orifices have been used as flow measuring devices in liquid systems. Liquid flowing through a constriction in a liquid flow line undergoes a pressure drop or a change in static head that is measured by differential pressure means across the construction (often by a mercury manometer). Taking into consideration other variables, the flow rate is calculated from this pressure differential. These calculations are well known to those skilled in the art. See Perry, Chemical Engineers' Handbook, pp. 400 et seq., third edition, 1950. Conventional constriction devices, however, have certain inherent disadvantages. For instance, constrictions in a chemical process line are troublesome because they are easily plugged by solids in the process stream. Also, bypass means are not provided to avoid the possible detrimental effects of plugging. The constriction device must then be disassembled and cleaned, which is, of course, difficult and expensive in some industrial situations. Differential pressure across the constriction is often measured with an ordinary mercury manometer. Consequently, this type of flow meter is not suited for liquids that are chemically incompatible with mercury. These problems are multiplied where the level of radioactivity is high and/or where a material to be pumped is highly toxic of corrosive.

Summary of the invention

In accordance with the present invention, it has been found that liquid flow can be continuously measured and, if necessary, controlled by providing a vessel, into which the liquid flows, having at its bottom a flow-restricting orifice so that a hydrostatic head of liquid is maintained in the vessel above the orifice. Since this head of liquid is a function of the liquid flow rate through the orifice, means for continuously measuring the liquid level or hydrostatic head above the orifice are provided. Control means responsive to the head measurement or the liquid level measurement in the vessel can be operatively connected to a pump or valve to control the liquid flow rate in the system. A uniform liquid flow can be maintained by selecting an orifice calibrated to a desired flow rate as a function of a particular head of liquid in the vessel. Additionally, the vessel is provided with at least one overflow port at a level above the normally desired liquid level to provide an integral liquid bypass means in the event that increased flow is required or the orifice becomes plugged.

The vessel is preferably disposed within a flow receptacle having a weir on its interior base and a liquid outlet adjacent the weir so that the orifice discharges above and behind the weir to provide a smooth liquid flow from the liquid outlet of the receptacle.

The present invention is useful in any system where a measure of liquid flow rate is required, such as for controlling the liquid flow rate in a pumping system. It is particularly suitable for use with pumps having discharges which are difficult to control, such as jet ejector type pumps. Discharge from a jet ejector may be difficult to control because of variations in the temperature and flow rate of the pumping fluid and fluctuations in the suction head of the liquid being pumped. This makes it difficult to achieve and maintain the steady discharge flow that is often desired in chemical processing situations. However, using the present flow measuring and controlling device in a liquid stream, it is possible to accurately control the discharge from a pump to provide a uniform continuous flow into a chemical process system. This uniform flow can be achieved in spite of problems hereinabove outlined.

Accordingly it is an object of the present invention to provide a simple and accurate means for measuring liquid flow.

It is another object to provide a new device for continuously measuring and controlling liquid flow in a pumping system.

These and other objects will be apparent by reference to the following detailed description of preferred embodiments and the appended drawings.

Description of the preferred embodiment

Figure 1:
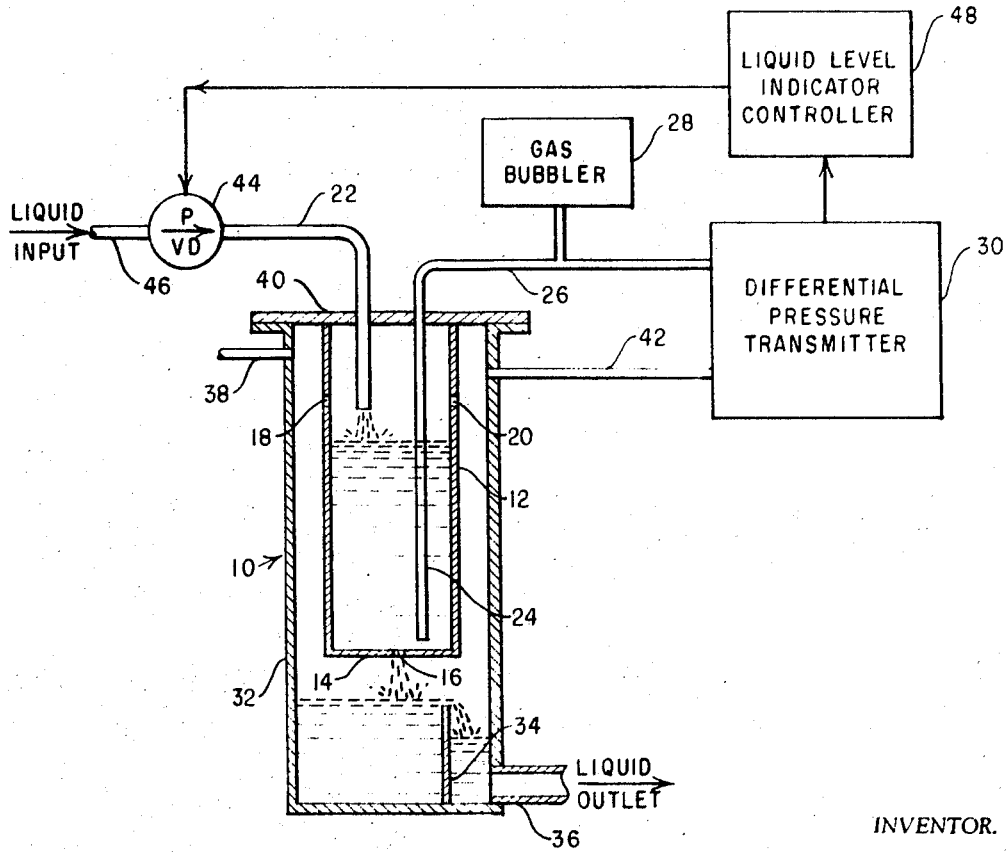
FIGURE 1 is a diagrammatic representation of a preferred embodiment of the present flow measuring device in connection with and adapted to control a liquid pumping system.

The preferred embodiment illustrated in FIGURE 1 comprises essentially a flow measuring device 10 together with associated measuring and control means adapted to control a liquid pumping system. Referring now to FIGURE 1 in detail, the principal component of the flow measuring device 10 is an elongated cylindrical vessel 12 having in its base 14 a flow-restricting orifice 16. Cylindrical vessel 12 is preferably attached to a flange plate 40 which provides a closure for its top and a means for attaching it to flow receptacle 32 hereinafter described. Liquid from a liquid system enters cylindrical vessel 12 through a liquid inlet conduit 22 which penetrates flange plate 40. Cylindrical vessel 12 is also provided with overflow ports 18 and 20 disposed in the walls of the upper portion of the vessel 12 at a level above the normally desired liquid level.

As part of the flow measuring device 10, means are provided to determine the rate of flow of the liquid through orifice 16 as a function of the head of liquid in cylindrical vessel 12. Although any suitable liquid level or hydrostatic head measuring device may be used, a conventional bubbler type liquid level measuring device is preferred. Therefore, a dip tube 24, having one end extending to near the bottom of vessel 12 and the other end penetrating flange plate 40, is connected through dip tube conduit 26 to gas bubbler 28 and to a differential pressure transmitter 30. The differential pressure transmitter 30 is in turn operatively connected to a liquid level indicator-controller 48. Bubbler 28 supplies air or an inert gas at low pressure through conduit 26 and dip tube 24 to below the surface of the liquid in vessel 12. The pressure necessary to force gas from the gas bubbler down dip tube 24 until it bubbles from the bottom of the tube at the desired reference point is supplied through conduit 26 to a pressure input of differential pressure transmitter 30. A second pressure (the pressure of the vapor space below the orifice or the ambient pressure) is also supplied to transmitter 30 through tube 42 as hereinafter described. Transmitter 30 is preferably a conventional type differential pressure instrument having two pressure inputs, a means to determine the difference between the two pressures, and an output means which transmits a proportional or an analog signal that is related to the difference in pressure inputs. Liquid level indicator-controller 48 responsive to the signal from transmitter 30 may be calibrated in liquid level, hydrostatic head, or in flow rate that is a function of the hydrostatic head. It is preferably calibrated to indicate the rate of flow from orifice 16 based on the hydrostatic head above the orifice 16.

Although discharge from vessel 12 through orifice 16 may be directly returned to a liquid system, it is preferred that vessel 12 be disposed within a suitable flow receptacle to smooth the flow before returning the liquid to a process system. Flow receptacle 32 comprises an elongated cylindrical tank having a liquid outlet 36 near its bottom and a vent 38 near the top. Adjacent outlet 36, a weir 34 is disposed on the interior base of receptacle 32 to separate the lower portion of receptacle 32 into a large reservoir and a small reservoir. This serves to smooth the flow of liquid from the measuring device 10. Cylindrical vessel 12 is preferably coaxially suspended within receptacle 32 from the flange plate 40. Vessel 12 is disposed so that its base 14 and orifice 16 are above the level of weir 34. Thus, liquid flowing from orifice 16 will discharge behind weir 34 into the large reservoir of receptacle 32. Flow receptacle 32 is also connected to differential pressure transmitter 30 by an ambient pressure tube 42 which penetrates the wall of receptacle 32. Ambient pressure tube 42 supplies the transmitter 30 with the pressure in receptacle 32, i.e. the pressure in the vapor space at the discharge side of orifice 16. Since tube 42 is connected to receptacle 32, the vent 38 may be closed, under pressure, or under suction and the pressure difference may still be determined in the transmitter 30. In the present preferred embodiment, however, the ambient pressure is atmospheric since vent 38 is open to the atmosphere.

The flow measuring device 10 may also be used for controlling the flow of liquid in a system by providing a controller means in liquid level indicator-controller 48. Transmitter 30 supplies an output signal, based on differences in pressure, dependent directly on the height of liquid above the orifice 16 to liquid level indicator-controller 48. The controller portion of indicator-controller 48 is then operatively connected to a valve or pump to control the flow of liquid through the system. In the present embodiment a variable delivery pump 44 has a liquid input 46 and a discharge into vessel 12 through inlet conduit 22.

Liquid level indicator-controller 48, which may be any suitable instrument responsive to a signal from a differential pressure transmitter is preferably calibrated to record the hydrostatic head above the orifice 16 as a function of liquid flow rate through the orifice 16. This, in turn, is a function of the rate of flow through the liquid inlet conduit 22 and out flow receptacle liquid outlet 36. Thus in the embodiment shown in FIG. 1, transmitter 30 provides an output signal based on the differences in pressure that is a function of the head of liquid above the orifice 16 to the controller portion of liquid level indicator-controller 48 which in turn controls pump 44.

Figure 2:
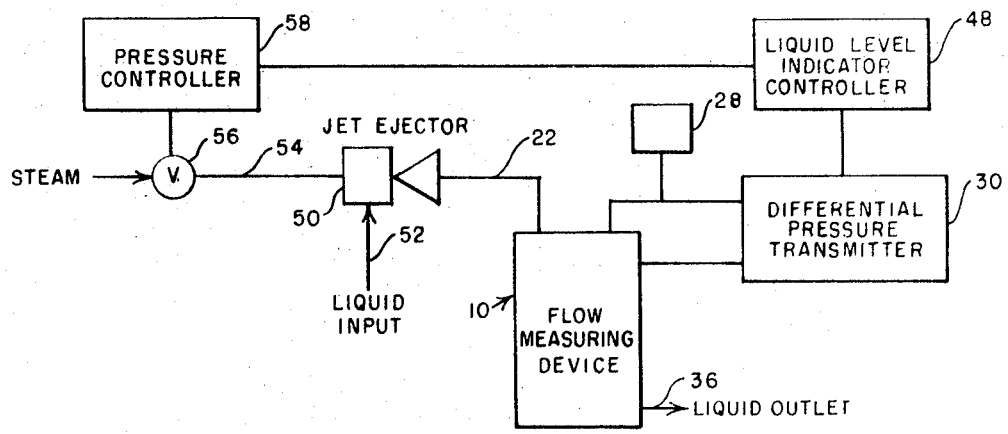
FIGURE 2 is a block diagram showing the present flow measuring device adapted to control a jet ejector type pumping system.

FIGURE 2 shows an alternative arrangement where liquid level indicator-controller 48 controls a jet ejector type pump. A jet ejector 50 to be used as the liquid pump has a liquid input 52 and a discharge connected to conduit 22. A pumping fluid inlet 54 supplies a pumping fluid through control valve 56. The preferred pumping fluid medium is steam under pressure and the control valve 56 controls the steam flow into fluid inlet 54 of the jet ejector. The steam entrains liquid entering the jet ejector 50 through liquid input 52 and the entrained liquid is discharged into vessel 12 through the liquid conduit 22. The flow measuring device 10, differential pressure transmitter 30, and liquid level indicator-controller 48 are the same as in FIGURE 1, except that a pressure controller 58 is added for controlling steam control valve 56. The flow measuring device 10 described hereinabove is particularly suitable for a jet ejector type pump because variations in suction lift steam pressure, temperature and flow rate will cause fluctuations in the jet ejector discharge.

From the foregoing description of the arrangement of the components of the present invention the operation thereof will be understood by those skilled in the art. A pre-established liquid level or hydrostatic head above the orifice 16 and below the level of overflow ports 18 and 20 is maintained in cylindrical vessel 12 by means of the gas bubbler 28 and the differential pressure transmitter 30 and is recorded in indicator-controller 48. The selected hydrostatic head above the orifice 16 is based on the desired flow rate from the orifice into the flow receptacle 32. Liquid flowing from the orifice 16 enters the larger reservoir of receptacle 32, flows over weir 34 into the smaller reservoir, and flows out of the receptacle 32 through liquid outlet 36. Fluctuations in liquid level or head in vessel 12 result in pressure differences which are supplied to the differential pressure transmitter 30 that in turn provides a signal to the liquid level indicator-controller 48. This liquid level continuously monitores the signal supplied by the transmitter 30 to indicator-controller 48, which in turn continuously compares this signal to a pre-established set point value and controls pump 34. In the embodiment shown in FIG. 2, the signal from liquid level indicator-controlled 48 activates pressure controller 58 to operate steam control valve 56. In either embodiment, if the liquid level or hydrostatic head in vessel 12 is too low for adequate flow through orifice 16 the flow through conduit 22 may be increased. If the liquid level in vessel 12 is too high the flow may be decreased. An inherent advantage of the present measuring device is that if a large increase of flow rate is desired the flow measuring device 10 can be flooded to provide additional flow through overflow ports 18 and 20. This also provides an integral bypass means in the event that orifice 16 is plugged by solids in the liquid stream.

Although this invention is described with reference to its preferred embodiments, it is contemplated that obvious modifications will occur to those skilled in the art and that such may be made without departing from the scope of this invetnion which is limited only as indicated in the appended claims.

What is claimed is:

1. A device for continuously controlling the flow of liquid in a jet pumping system which comprises, in combination:

(a) a jet ejector operated by a pumping fluid, said ejector adapted to pump said liquid;

(b) a vessel adapted to receive the liquid discharge from said jet ejector, said vessel having at its bottom a flow-restricting orifice so that a hydrostatic head of liquid is maintained above said orifice;

(c) gas bubbler liquid level measuring means connected to said vessel for continuosuly measuring the head of liquid above said orifice;

(d) control means operatively connected to said measuring means for controlling the pressure of said pumping fluid into said ejector in response to the measured head of liquid in said vessel, whereby the flow of liquid through said pumping system is continuously controlled.

2. The device of claim 1 wherein said control means includes a pressure controller responsive to the output of said measuring means and a pressure control valve for controlling the flow of pumping fluid into said ejector in response to the said pressure controller.

3. The device of claim 1 wherein said measuring means includes a dip tube disposed within said vessel connected to a gas bubbler liquid level measuring means, a differential pressure transmitter connected to said gas bubbler, and a liquid level indicator-controller connected to said pressure transmitter, said indicator-controller responsive to the output of said pressure transmitter to indicate the level of liquid in said vessel above said orifice.

4. The device of claim 1 wherein said vessel has an integral liquid bypass means to bypass liquid flow around said orifice.

5. The device of claim 1 wherein said vessel is disposed within a flow receptacle, said flow receptacle having a weir on its interior base defining a large reservoir and a small reservoir and an outlet means adjacent said small reservoir, said orifice discharge being above the level of said weir so that liquid from said orifice discharges being said weir into said large reservoir to provide uniform liquid flow from said outlet means.

6. The device of claim 1 wherein said ejector is a steam jet ejector and said pumping fluid is steam.

References Cited

UNITED STATES PATENTS

| | | | |
|---|---|---|---|
| 970,411 | 9/1910 | Woodall | 137—97 |
| 1,645,639 | 10/1927 | Anderson | 137—97 |
| 2,147,977 | 2/1939 | Kalle | 137—386 X |
| 2,153,450 | 4/1939 | Borden | 73—215 |
| 2,815,765 | 12/1957 | Adelson | 73—216 X |
| 2,889,846 | 6/1959 | Glasby et al. | 73—394 X |
| 3,360,002 | 12/1967 | Weis et al. | 137—395 |

FOREIGN PATENTS

| | | |
|---|---|---|
| 225,031 | 4/1943 | Switzerland. |
| 649,754 | 1/1951 | Great Britain. |

RICHARD C. QUEISSER, Primary Examiner

JOHN WHALEN, Assistant Examiner

U.S. Cl. X.R.

73—96; 103—271; 137—571